United States Patent [19]

Schade

[11] 4,238,822

[45] Dec. 9, 1980

[54] CONTROLLABLE ELECTRICAL SINGLE-ARMATURE OF ROTARY CONVERTER

[76] Inventor: Walter Schade, Alter Postweg 28, 427 Dorsten, Fed. Rep. of Germany

[21] Appl. No.: 882,769

[22] Filed: Mar. 2, 1978

[30] Foreign Application Priority Data

Mar. 5, 1977 [DE] Fed. Rep. of Germany ........ 2709681

[51] Int. Cl.³ .................... H02M 7/34; H02M 7/60
[52] U.S. Cl. .................................................. 363/107
[58] Field of Search ................. 310/129, 160; 363/102–104, 109, 107

[56] References Cited

U.S. PATENT DOCUMENTS

| | | | |
|---|---|---|---|
| 3,858,107 | 12/1974 | Yarrow et al. | 310/160 X |
| 4,024,455 | 5/1977 | Yarrow et al. | 363/102 |

*Primary Examiner*—William M. Shoop
*Attorney, Agent, or Firm*—Herbert L. Lerner

[57] ABSTRACT

Controllable electric rotary converter includes a drum armature winding having a plurality of partial coils, a multiplicity of electric switches consecutively connectible by a single pole with one of the input and output sides of the direct-current side of the drum armature winding for transmitting a current therethrough, a plurality of induction coils connectible with the electric switches and energizable by the current.

3 Claims, 1 Drawing Figure

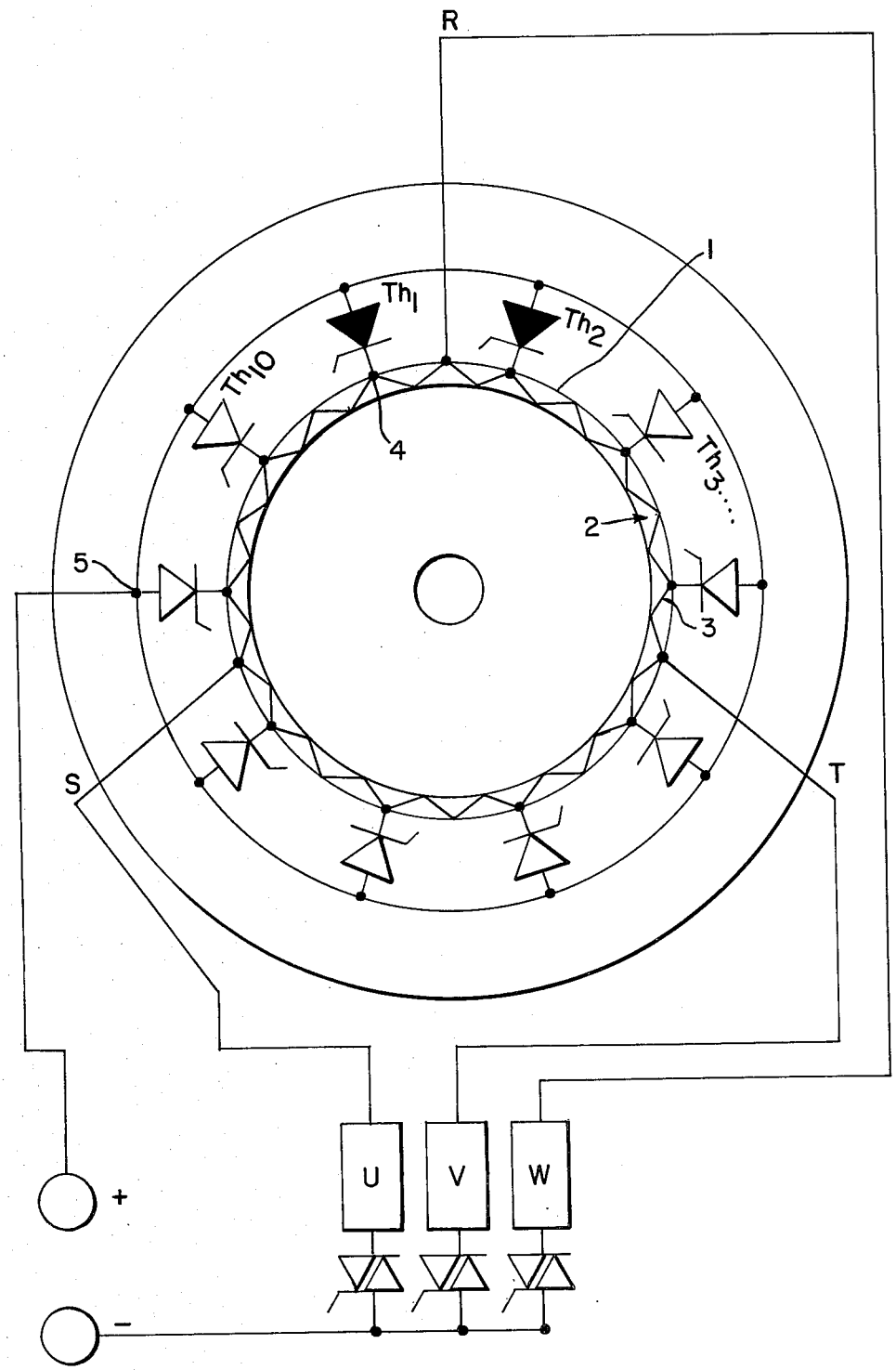

CONTROLLABLE ELECTRICAL SINGLE-ARMATURE OF ROTARY CONVERTER

The invention relates to controllable electric rotary converter.

Rotary converters are electric machines having multifaceted uses including the conversion of direct current to alternating or three-phase currents and vice versa. Such converters can also couple direct-current and three-phase i.e. alternating-current, power supply systems and power inputs and outputs of machines as well as generators to one another in the most varied manner. A rotary converter usually has, on the direct-current side thereof, a drum-armature winding which is supplied from a direct-current source through a commutator and brushes or supplies current therethrough to the direct-current source. The converter can equally receive or deliver either alternating or direct-current because the drum armature winding is tapped at specific locations thereof and the alternating or three-phase current can be supplied thereto or withdrawn therefrom through slip rings.

For continuous operation, electric machines with slipping or sliding current paths are not desirable, because the servicing costs for maintenance and repair work, as well as the make-ready or standby costs for replacement machines for the duration of the work that is to be performed, can hardly be economical.

It is an object of the invention to provide a controllable electric rotary converter which avoids the foregoing disadvantages of heretofore known rotary converters of this general type.

With the foregoing and other objects in view, there is provided, in accordance with the invention, a controllable electric rotary converter including a drum armature winding having a plurality of coil sections or partial coils, a multiplicity of electric switches consecutively connectible by a single pole with one of the input and output sides of the direct-current side of the drum armature winding for transmitting a current therethrough, a plurality of induction coils connectible with the electric switches and energizable by the current.

Wear of sliding current paths can be moderated, in accordance with the invention, by making the drum armature winding stationary and letting the magnetic excitation field rotate. Wear can be avoided completely, further in accordance with the invention, by feeding or energizing the drum armature winding of the machines through electronic components such as transistors, thyristors or other valves.

In accordance with an additional feature of the invention, the induction coils are choke coils.

In accordance with a further feature of the invention, the induction coils are comprised of transformers.

In accordance with an added feature of the invention, the induction coils are three-phase alternating-current exciters.

In accordance with a concomitant feature of the invention, the induction coils constitute a self-exciting winding for effecting at least one of a reinforcement, weakening and phase shift of the rotary field of the converter.

In accordance with a further feature of the invention, the drum armature winding is stationary, and includes connecting lines to and from current supply locations of the rotary converter, the connecting lines being fixed.

In accordance with yet another feature of the invention, the electric switches are electronic switches.

In accordance with yet an additional feature of the invention, the electronic switches are bidirectional and constitute a phase-angle control in a three-phase or alternating current circuit of the rotary converter.

Other features which are considered as characteristic for the invention are set forth in the appended claims.

Although the invention is illustrated and described herein as embodied in controllable electric rotary converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a circuit diagram of the controllable electric rotary armature according to the invention.

Referring now to the drawing, there is shown therein a ring 1 representing a stator packet of laminations or metal sheets with a drum armature winding 2. The inputs or supply locations 4 of the coil sections or partial coils 3 of the winding 2 are consecutively connected through thyristors $Th_1$ to $Th_{10}$ to a direct-current source by connection points 5 thereof and, during the step-by-step switching, are canceled or electrically "disconnected," at least two adjacent thyristors being simultaneously conductive (note German Published Prosecuted Application DT-AS 2 133 489).

The operating or working current flows through the armature winding and emerges as a three-phase current at the locations R, S and T.

The three-phase current is fed to induction coils U, V and W which are brought together in the neutral or star point "zero" and are connected there to the negative terminal of the current source.

The three-phase current occurring in the coils U, V and W can be made useful in various ways, for example, in chokes, also in controllable inductors (transducers), furthermore in transformers, and also in connection with rectifiers so that the direct current occurring therein can be made useful, for example, the direct-current supply source can be superposed. In addition, the three-phase current can serve for supplying induction motors as with three-phase alternating-current exciters or Siemens-Lydall exciters of cascades.

Finally, the magnetic fields of the coils U, V and W can be directly coupled, in a conventional manner, to the rotating field of the drum armature winding.

The technical advance demonstrated by the invention of the instant application is that the expense of components for the same number of switching steps is only about half that for heretofore known rotary converters of this general type. Moreover, the heretofore conventional antiparallel connection of the components is avoided in the invention and the operational reliability of the rotary converter according to the invention is thereby considerably increased.

Then, the control can be effected through phase angle control in the three-phase part through bidirectional switches, in which case the control device becomes extraordinarily simple.

An advantage of the invention is also to be seen in that the electronic switch can be mounted only on one common cooling member because the anodes of the electronic switch have the same polarity.

There are claimed:

1. Controllable electronic rotary converter without a collector, comprising a ring-shaped drum armature winding having a plurality of individual coil sections with inputs therebetween, a multiplicity of electronic switches consecutively connecting said coil-section inputs and having connection points, at least one of said connection points being connectible to a direct current source for switching said coil-section inputs to said electronic switches through a single pole, and a plurality of induction coils carrying outgoing current between said coil sections and a neutral star point which is further connected to a negative pole of the current source.

2. Controllable rotary converter according to claim 1, wherein said induction coils are feedback windings effecting at least one of reinforcing, weakening and phase shift of the primary rotating field of the converter.

3. Controllable rotary converter according to claim 1, wherein said electronic switches are bidirectional and constitute phase-angle control of the current of the converter.

* * * * *